US006610814B2

(12) United States Patent
Lemmon et al.

(10) Patent No.: US 6,610,814 B2
(45) Date of Patent: Aug. 26, 2003

(54) COMPOUNDS OF ANTIMONY AND GERMANIUM AS CATALYSTS FOR MELT POLYCARBONATE

(75) Inventors: John Patrick Lemmon, Delanson, NY (US); Oltea Puica Siclovan, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 41 days.

(21) Appl. No.: 10/007,347

(22) Filed: Oct. 25, 2001

(65) Prior Publication Data

US 2003/0114634 A1 Jun. 19, 2003

(51) Int. Cl.⁷ ............................................... C08G 64/00
(52) U.S. Cl. ........................ 528/198; 528/196; 502/150; 502/157
(58) Field of Search ................................ 528/196, 198; 502/150, 157

(56) References Cited

U.S. PATENT DOCUMENTS

| | | |
|---|---|---|
| 5,191,038 A | 3/1993 | Krabbenhoft et al. |
| 5,319,066 A | 6/1994 | King, Jr. |
| 5,344,908 A | 9/1994 | Rosenquist |
| 5,373,083 A | 12/1994 | King, Jr. et al. |
| 5,412,061 A | 5/1995 | King, Jr. et al. |
| 5,461,121 A | 10/1995 | Rosenquist |
| 5,516,878 A | 5/1996 | Sasaki et al. |
| 5,912,318 A * | 6/1999 | Hasegawa et al. .......... 528/196 |
| 5,973,103 A | 10/1999 | Silva et al. |
| 6,300,459 B1 | 10/2001 | Kaneko et al. |

* cited by examiner

*Primary Examiner*—Terressa M. Boykin
(74) *Attorney, Agent, or Firm*—Andrew J. Caruso; Noreen C. Johnson

(57) ABSTRACT

The present invention relates to a synthetic method in which one or more diaryl carbonates is reacted with one or more dihydroxy aromatic compounds in the presence of a transesterification catalyst under melt polymerization conditions to afford a product polycarbonate. The transesterifcation catalysts used according to the method of the present invention are alkali metal salts and alkaline earth metal salts of antimony oxides or germanium oxides in combination with tetraalkyl ammonium or tetraalkyl phosphonium compounds which serve as co-catalysts. The antimony oxide derivative "tartar emetic", structure IV, was shown to possess excellent activity as a transesterifcation catalyst for the preparation of polycarbonate under melt polymerization conditions. The catalysts employed according to the method of the present invention provide polycarbonates having substantial molecular weight ($M_n$~7000–10000 daltons) and reduced levels of Fries rearrangement product relative to conventionally prepared melt polycarbonate having a similar molecular weight.

33 Claims, No Drawings

COMPOUNDS OF ANTIMONY AND GERMANIUM AS CATALYSTS FOR MELT POLYCARBONATE

BACKGROUND OF THE INVENTION

This invention relates to salts of antimony and germanium oxides useful as transesterification catalysts in melt polymerization reactions of dihydroxy aromatic compounds with diaryl carbonates. The invention further relates to a method for the preparation of polycarbonates using alkali and alkaline earth metal salts of antimony oxides and germanium oxides. The method may be used to provide a product polycarbonate comprising a lower level of Fries product than is provided by other known methods employing conventional melt transesterification catalysts.

Increasingly, polycarbonate is being prepared by the melt reaction of a diaryl carbonate with a dihydroxy aromatic compound in the presence of a transesterification catalyst, such as sodium hydroxide. In this "melt" process, reactants are introduced into a reactor capable of stirring a viscous polycarbonate melt at temperatures in excess of 300° C. Typically, the reaction is run at reduced pressure to facilitate the removal of by-product hydroxy aromatic compound formed as the diaryl carbonate reacts with the dihydroxy aromatic compound and growing polymer chains.

The Fries rearrangement is a ubiquitous side reaction taking place during the preparation of polycarbonate using the melt process. The resultant "Fries product" serves as a site for branching of the polycarbonate chains thereby affecting flow and other properties of the polycarbonate. Although, a low level of Fries product may be tolerated in the product polycarbonate produced by the melt process, the presence of higher levels of Fries product may negatively impact performance characteristics of the polycarbonate, such as moldability and toughness. Currently, alkali metal hydroxides, such as sodium hydroxide, are employed as catalysts in the preparation of polycarbonate using the melt process. Alkali metal hydroxides, although effective catalysts in terms of rates of conversion of starting materials to product polycarbonate, tend to produce relatively high levels of Fries rearrangement product. Thus, melt polymerization methodology useful for the preparation of polycarbonate in which the formation of Fries product has been minimized represents a long sought goal among those wishing to practice such methodology.

It would be a significant advantage to prepare polycarbonate by a melt polymerization method which provides high rates of polymerization while minimizing the amount of Fries product formation.

BRIEF SUMMARY OF THE INVENTION

The present invention provides a method for the preparation of polycarbonate, said method comprising contacting at least one diaryl carbonate with at least one dihydroxy aromatic compound in the presence of a transesterification catalyst comprising at least one alkali metal or alkaline earth metal salt of an antimony or germanium oxide and optionally a co-catalyst, under melt polymerization conditions to afford a product polycarbonate.

In one aspect the method of the present invention affords a product polycarbonate having a lower level of Fries rearrangement product than polycarbonate of similar molecular weight prepared using a conventional melt transesterification catalyst.

The present invention further relates to a method of preparing polycarbonate under melt polymerization conditions by reacting at least one dihydroxy aromatic compound with at least one diaryl carbonate in the presence of at least one salt of antimony oxide or germanium oxide, said salt having structure I

wherein M is antimony or germanium, n is an integer in a range from 0 to 4, m is an integer in a range from 1 to 2, A is independently at each occurrence an alkali metal ion or an alkaline earth metal ion, p is an integer in a range from 1 to 4, $R^1$ is an organic ligand, and q is an integer in a range from 0 to 2.

DETAILED DESCRIPTION OF THE INVENTION

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from at least one dihydroxy aromatic compounds and includes copolycarbonates and polyester carbonates.

As used herein, the term "melt polycarbonate" refers to a polycarbonate made by a process comprising the transesterification of a diaryl carbonate with a dihydroxy aromatic compound in the presence of a transesterification catalyst.

"BPA" is herein defined as bisphenol A or 2,2-bis(4-hydroxyphenyl)propane.

"Catalyst system" as used herein refers to the catalyst or catalysts that catalyze the transesterification of the dihydroxy aromatic compound with the diaryl carbonate in the preparation of melt polycarbonate.

"Catalytically effective amount" refers to the amount of the catalyst at which catalytic performance is exhibited.

As used herein the term "Fries product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, the Fries product affords carboxy bisphenol A, II, upon complete hydrolysis of the product polycarbonate.

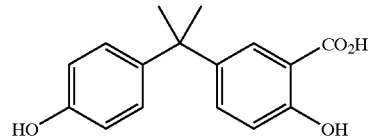

The terms "Fries product" and "Fries group" are used interchangeably herein.

The terms "Fries reaction" and "Fries rearrangement" are used interchangeably herein.

As used herein the term "hydroxy aromatic compound" means a phenol, such as phenol, p-cresol or methyl salicylate, comprising a single reactive hydroxy group and is used interchangeably with the term "phenolic by-product".

As used herein the term "aliphatic radical" refers to a radical having a valence of at least two comprising a linear or branched array of carbon atoms which is not cyclic. Examples of aliphatic radicals include methylene; ethylene; 1,2-dimethylethylene; hexamethylene; and the like.

As used herein the term "aromatic radical" refers to a radical having a valence of at least two, said radical comprising at least one aromatic group. The aromatic radical may be composed entirely of carbon and hydrogen atoms, or may comprise heteroatoms such as nitrogen, oxygen and sulfur.

As used herein the term "cycloaliphatic radical" refers to a radical having a valance of at least two comprising an array of atoms which is cyclic but which is not aromatic. The array may include heteroatoms such as nitrogen, sulfur and oxygen or may be composed exclusively of carbon and hydrogen.

It should be understood that as used herein, the terms "aliphatic radical", "aromatic radical" and "cycloaliphatic radical" include both substituted and unsubstituted embodiments of said radicals. Typical substituents according to the present invention for the substituted forms of aliphatic, aromatic and cycloaliphatic radicals include $C_1$–$C_{20}$ alkyl, $C_3$–$C_{20}$ cycloalkyl, $C_4$–$C_{20}$ aryl, halogen, hydroxy, carbonyl, nitro, cyano, $C_1$–$C_{20}$ alkoxy, $C_1$–$C_{20}$ alkoxycarbonyl, and the like.

It should be understood that the terms "mmHg" and "torr" are used interchangeably herein as units of pressure.

It has been discovered that the use of salts of antimony oxides or germanium oxides as polymerization catalysts in the melt transesterification reaction of a dihydroxy aromatic compound such as bisphenol A with a diaryl carbonate such as diphenyl carbonate, provides a product polycarbonate comprising a reduced level of Fries rearrangement product. This reduction in the amount of Fries rearrangement is highly desirable in that it results in increased ductility of the product polycarbonate and avoids uncontrolled branching which may occur at sites of Fries rearrangement. Uncontrolled branching may limit the utility of the product polycarbonate by reducing the ductility of the product polycarbonate. Salts of antimony oxides or germanium oxides employed as transesterification catalysts according to the method of the present invention produced less Fries rearrangement product than did alkali metal hydroxide transesterification catalysts, such as sodium hydroxide.

In one embodiment, the present invention provides a catalyst system for the production of polycarbonate under melt polymerization conditions, wherein the polycarbonate has a number average molecular weight, $M_n$ of at least about 8000 daltons and a reduced content of Fries products relative to a polycarbonate of comparable molecular weight prepared using an alkali metal hydroxide transesterification catalyst. In particular, it is desirable to have Fries product of less than 3000 ppm, preferably less than 2000 ppm, more preferably less than 1000 ppm, even more preferably less than 500 ppm.

The transesterification catalyst according to the present invention comprises at least one alkali metal or alkaline earth salt of antimony oxide or germanium oxide, having structure I $$(MO_n)_m(A)_p(R^1)_q \qquad\qquad I$$

wherein M is antimony or germanium, n is an integer in a range from 0 to 4, m is an integer in a range from 1 to 2, A is independently at each occurrence an alkali metal ion or an alkaline earth metal ion, p is an integer in a range from 1 to 4, $R^1$ is an organic ligand, and q is an integer in a range from 0 to 2.

In one embodiment of the present invention structure I represents a series of antimony oxide derivatives wherein M is an antimony atom (Sb), n is an integer having a value of 3, m is an integer having a value of 1 or 2, A is an alkali metal cation or an alkaline earth metal cation, and q is an integer having a value of 0, there being no organic ligand $R^1$. Suitable examples of such antimony oxide derivatives include $NaSbO_3$, $LiSbO_3$, $KSbO_3$, and $Mg(SbO_3)_2$. In one embodiment of the present invention the transesterification catalyst comprises sodium antimonate, $NaSbO_3$.

In an alternate embodiment of the present invention structure I is an alkali metal or alkaline earth salt derivative of antimony oxide wherein M is Sb, n is 0, m is 2, A is an alkali metal ion or an alkaline earth metal ion, p is 1 or 2, q is 2, and $R^1$ is an organic ligand having structure III.

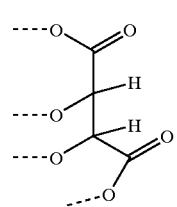

III

Thus, in one embodiment of the present invention the transesterification catalyst is the tartarate derivative IV, sometimes referred to as "tartar emetic", a compound with a rich history as a medicinal agent.

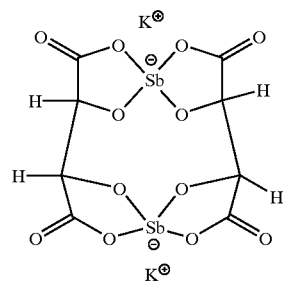

IV

As has been noted, the transesterification catalyst according to the present invention is in some embodiments an alkali metal or alkaline earth salt of or germanium oxide, having structure I. In these embodiments, with respect to structure I, M is a germanium atom (Ge), n is an integer having a value of 3 or 4, m is an integer having a value of 1, A is an alkali metal ion or an alkaline earth metal ion, p is an integer having a value of 1 or 2, and q is zero, there being no organic ligand. Suitable examples of such germanium oxide derivatives, the meta germanate and ortho germanate derivatives of $Na_2GeO_3$, $K_2GeO_3$, $Li_2GeO_3$, $MgGeO_3$, and $Mg_2GeO_4$. In one embodiment of the present invention the transesterification catalyst comprises sodium meta germanate, $Na_2GeO_3$.

The present invention relates to salts of antimony oxides or germanium oxides useful as catalysts under melt polymerization conditions comprising contacting at least one dihydroxy aromatic compound and at least one diaryl carbonate. Dihydroxy aromatic compounds which are useful in preparing polycarbonates according to the method of the present invention may be represented by the general formula V

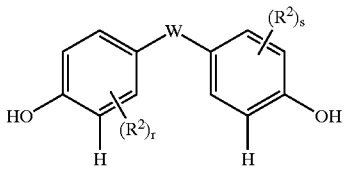

wherein $R^2$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; r and 5 are independently integers 0–3; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

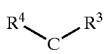

wherein $R^3$ and $R^4$ are independently a hydrogen atom, $C_1$–$C_{20}$ alkyl group, $C_4$–$C_{20}$ cycloalkyl group, or $C_4$–$C_{20}$ aryl group; or $R^3$ and $R^4$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

Suitable bisphenols V according to the method of the present invention include bisphenol A; 2,2-bis(4-hydroxy-3-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; and 1,1-bis(4-hydroxyphenyl)-3,3,5-trimethylcyclohexane.

In one aspect of the present invention, the diaryl carbonate used according to the method of the present invention has structure VI

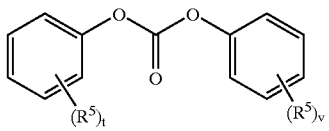

wherein $R^5$ is independently at each occurrence a halogen atom, nitro group, cyano group, $C_1$–$C_{20}$ alkyl group, $C_1$–$C_{20}$ alkoxy carbonyl group, $C_4$–$C_{20}$ cycloalkyl group, or $C_6$–$C_{20}$ aryl group; and t and v are independently integers 0–5.

Diaryl carbonates VI suitable for use according to the method of the present invention are illustrated by diphenyl carbonate, bis(4-methylphenyl)carbonate, bis(4-chlorophenyl)carbonate, bis(4-fluorophenyl)carbonate, bis(2-chlorophenyl)carbonate, bis(2,4-difluorophenyl)carbonate, bis(4-nitrophenyl)carbonate, bis(2-nitrophenyl)carbonate, and bis(methyl salicyl)carbonate (CAS No. 82091-12-1).

In one embodiment, structural units of the product polycarbonate derived from the dihydroxy aromatic compound are comprised entirely of structural units derived from bisphenol A, and structural units derived from the diaryl carbonate are derived entirely from diphenyl carbonate.

Optionally, one or more branching agents may be included during the melt polymerization reaction according to the method of the present invention as a means of effecting the controlled branching of the product polycarbonate as is sometimes desirable in applications, such as in blow molding of beverage bottles, requiring a high degree level of melt strength. Suitable branching agents include 1,1,1-tris(4-hydroxyphenyl)ethane (THPE) and 1,3,5-trihydroxybenzene.

In the process of the present invention, an endcapping agent may optionally be used. Suitable endcapping agents include hydroxy aromatic compounds such as phenol, p-tert-butylphenol, p-cumylphenol, cardanol and the like.

When an endcapping agent is employed said endcapping agent is preferably used in an amount corresponding to between about 0.001 and about 0.10 moles, preferably about 0.01 to about 0.08 moles per mole of the dihydroxy aromatic compound employed.

The catalyst having structure I is employed in an amount corresponding to between about $1\times10^{-8}$ and $2.5\times10^{-4}$, preferably between about $1\times10^{-7}$ and $2.5\times10^{-5}$ moles of catalyst per mole of dihydroxy aromatic compound employed. When the amount of catalyst employed is less than $1\times10^{-8}$ mole of catalyst per mole of dihydroxy aromatic compound employed, reaction rates may be reduced to such an extent that no appreciable molecular weight gain is observed. Generally, it is preferred that the number average molecular weight ($M_n$) of the product polycarbonate be at least about 8000 daltons. When the amount of catalyst is in excess of about $2.5\times10^{-4}$ moles per mole of dihydroxy aromatic compound employed, rates of Fries rearrangement may be excessive and high levels of uncontrolled branching may occur.

The transesterification catalyst may be added in a variety of forms according to the method of the present invention. The catalyst may be added as a solid, for example a powder, or it may be dissolved in a solvent, for example water or alcohol. In one embodiment, the catalyst is added to the reaction system in the form of an aqueous solution. The pH of the aqueous solution is preferably at or near the pH of a freshly prepared solution, which varies depending on the identity of the catalyst used.

If the catalyst is not soluble in water or only sparingly soluble in water, the catalyst may be dissolved in a solution comprising a quaternary ammonium compound, a quaternary phosphonium compound, or a mixture thereof, and the solution comprising the catalyst and said onium compound may be used.

The use of a quaternary ammonium compound, a quaternary phosphonium compound, or a mixture thereof, as a co-catalyst is not limited to instances in which the catalyst has low solubility and is introduced into the reaction mixture as an aqueous solution. Quaternary ammonium compounds, quaternary phosphonium compounds, and mixtures thereof, may be employed as co-catalysts and may be introduced into the reaction mixture in a variety of forms; as solids, in solution, or as a melt. Examples of suitable quaternary ammonium compounds include, but are not limited to ammonium hydroxides having alkyl groups, aryl groups and alkaryl groups, such as tetraamethylammonium hydroxide (TMAH) and tetrabutylammonium hydroxide (TBAH). Suitable phosphonium compounds include, but are not limited to tetraethylphosphonium hydroxide, tetrabutylphosphonium hydroxide, and tetrabutylphosphonium acetate.

If present, the quaternary ammonium compound, the quaternary phosphonium compound, or a mixture thereof, is preferably used in amounts of from about $1\times10^{-2}$ to about $1\times10^{-6}$, preferably about $1\times10^{-2}$ to about $1\times10^{-5}$ moles per mole of dihydroxy aromatic compound. The quaternary onium compounds may be used to enhance or modify the activity of the antimony or germanium oxide derivative employed as the primary catalyst.

In some instances the reaction mixture may further comprise a metal hydroxide, for example, an alkali metal hydroxide such as sodium hydroxide. The free metal hydroxide may be added to enhance the activity of the alkali metal or alkaline earth metal salt of an antimony or germanium oxide employed as the primary catalyst, or may be present as a contaminant in the primary catalyst itself. If present, the free metal hydroxide is preferably present in an amount in an amount corresponding to between about $1\times10^{-8}$ and $2.5\times10^{-4}$ moles of catalyst per mole of dihydroxy aromatic compound employed.

The reaction conditions of the melt polymerization are not particularly limited and may be conducted in a wide range of operating conditions. Hence, the term "melt polymerization conditions" will be understood to mean those conditions necessary to effect reaction between the diaryl carbonate and the dihydroxy aromatic compound of the present invention. The reaction temperature is typically in the range of about 100 to about 350° C., more preferably about 180 to about 310° C. The pressure may be at atmospheric pressure, supraatmospheric pressure, or a range of pressures from atmospheric pressure to about 15 torr in the initial stages of the reaction, and at a reduced pressure at later stages, for example in the range of about 0.2 to about 15 torr. The reaction time is generally about 0.1 hours to about 10 hours.

The melt polymerization may be accomplished in one or more stages, as is known in the art with other catalysts. The catalyst and co-catalysts of the present invention may be added in the same stage or different stages, if the melt polymerization is conducted in more than one stage. The optional co-catalyst may be added at any stage, although it is preferred that it be added early in the process. When utilized, the co-catalyst is preferably utilized in an amount corresponding to between about 1 and about 500 molar equivalents, based on the moles of catalyst I utilized.

In a further preferred embodiment, the process is conducted as a two stage process. In the first stage of this embodiment, the optional co-catalyst of the present invention is introduced into the reaction system comprising the dihydroxy aromatic compound and the diaryl carbonate. The first stage is conducted at a temperature of 270° C. or lower, preferably 80 to 250° C., more preferably 100 to 230° C. The duration of the first stage is preferably 0 to 5 hours, even more preferably 0 to 3 hours at a pressure from about atmospheric pressure to about 100 torr, with a nitrogen atmosphere preferred.

In a second stage, the catalyst having structure I is introduced into the product from the first stage and further polycondensation is conducted. The catalyst may be added in its entire amount in the second stage, or it may be added in batches in the second and subsequent stages so that the total amount is within the aforementioned ranges.

It is preferable in the second and subsequent stages of the polycondensation step for the reaction temperature to be raised while the reaction system is reduced in pressure compared to the first stage, thus bringing about a reaction between the dihydroxy aromatic compound and the diaryl carbonate. Thus there is formed initially a polycarbonate oligomer which upon further polycondensation reaction at 240 to 320° C. under reduced pressure of 5 mm Hg or less, and preferably 1 mm Hg or less, affords polycarbonate having a number average molecular weight of about 8000 daltons or greater.

If the melt polymerization is conducted in more than one stage, as noted above, it is preferable to add a co-catalyst, such as tetramethylammonium hydroxide, tetrabutylammonium hydroxide, tetrabutylphosphonium hydroxide, or tetrabutylphosphonium acetate, in an earlier stage than the catalyst of the present invention. In particular, it is preferable to add the co-catalyst to the reactor before the temperature reaches 220° C., preferably before it reaches 200° C.

The reaction can be conducted as a batch or a continuous process. Any desired apparatus can be used for the reaction. The material and the structure of the reactor used in the present invention is not particularly limited as long as the reactor has an ordinary capability of stirring and is equipped for the removal of by-product hydroxy aromatic compound formed during the course of the polymerization. It is preferable that the reactor is capable of stirring in high viscosity conditions as the viscosity of the reaction system is increased in later stages of the reaction.

Thus, in a further embodiment, the present invention provides a method for preparing polycarbonates, which comprises the steps of (a) heating a dihydroxy aromatic compound and a diaryl carbonate for a time period sufficient to form a melt, and thereafter introducing a catalyst composition comprising a catalytically effective amount of a compound having structure I and optionally a co-catalyst selected from tetraalkylammonium and tetraalkylphosphonium compounds;

(b) oligomerizing the melt mixture formed in step (a) in a reaction system comprising at least one continuous reactor in series, wherein said reactor is operated at a temperature of about 210° C. to about 290° C., and wherein the product from the reactor has a number average molecular weight of about 1000 to about 5500 daltons; and (c) polymerizing the product from step (b) in a reaction system comprising at least one continuous polymerization reactor in series, wherein said reactor is operated at a temperature of about 280° C. to 315° C., wherein the product from step (c) has a number average molecular weight of at least about 8000 daltons.

Additives may also be added to the polycarbonate product as long as they do not adversely affect the properties of the product. These additives include a wide range of substances that are conventionally added to the polycarbonates for a variety of purposes. Specific examples include heat stabilizers, epoxy compounds, ultraviolet absorbers, mold release agents, colorants, antistatic agents, slipping agents, anti-blocking agents, lubricants, antifogging agents, natural oils, synthetic oils, waxes, organic fillers, flame retardants, inorganic fillers and any other commonly known class of additives.

The polycarbonate obtained in accordance with the present invention may be used after being mixed with conventional additives, such as plasticizers, pigments, lubricants, mold release agents, stabilizers and organic fillers. It is also possible to blend the polycarbonate with other polymers, including but not limited to, olefins polymers such as ABS and polystyrenes, polyesters, polyacrylates, polyethersulfones, polyamides, and polyphenylene ethers.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C.

To facilitate observations and for purity, melt transesterification reactions were carried out in a 1 Liter glass batch reactor equipped with a solid nickel helical agitator. The reactor bottom had a breakaway glass nipple for removal of the final melt. To remove any sodium from the glass the reactor was soaked in 3N HCl for at least 12 hours, followed by a soak in 18 Mohm water for at least 12 hours. The reactor was then dried in an oven overnight and stored covered until use. The temperature of the reactor was maintained using a fluidised sand bath with a PID controller. The temperature was measured near the reactor and sand bath interface. The pressure over the reactor was controlled by a nitrogen bleed into the vacuum pump downstream of the distillate collection flasks and measured at higher pressures (760 mmHg–40 mmHg) with a mercury barometer and at lower pressures (40 mmHg–1 mmHg) with an Edwards pirani gauge.

The reactor was charged with solid Bisphenol-A (General Electric Plastics Japan Ltd., 0.6570 mol) and solid diphenyl carbonate (General Electric Plastics Japan Ltd., 0.7096 mol) prior to assembly. The reactor was then assembled, sealed, and the atmosphere was exchanged with nitrogen three times. With the final nitrogen exchange, the reactor was brought to near atmospheric pressure and submerged into the fluidised bath which was at 180° C. After five minutes agitation was begun at 250 rpm. After an additional ten minutes the reactants were fully melted and the mixture was assumed to be homogeneous. Tetramethyl ammonium hydroxide (TMAH) (Sachem, $1.64 \times 10^{-4}$ mole in 740 microliters of water) was added and the catalyst of the invention ($0.5 \times 10^{-6}$ to $5 \times 10^{-6}$ moles catalyst per mole bisphenol A) was added to the mixture as a solution in deionized (18 Mohm) water (660 microliters). After the catalyst was added, timing began and the temperature was ramped to 210° C. in five minutes. Once at temperature, the pressure was reduced to 180 mmHg and phenol distillate was immediately observed. After 25 minutes the pressure was again reduced to 100 mmHg and maintained for 45 minutes. The temperature was then ramped to 240° C. in five minutes and the pressure was lowered to 15 mmHg. These conditions were maintained for 45 minutes. The temperature was then ramped to 270° C. in five minutes and the pressure was lowered to 2 mmHg. These conditions were maintained for 10 minutes. The temperature was then ramped to the final finishing temperature in five minutes and the pressure was reduced to 1.1 mmHg. The finishing temperature was 310° C. After 30 minutes the reactor was removed from the sand bath and the product polymer melt was poured into liquid nitrogen to quench the reaction.

Number average molecular weight ($M_n$) was obtained by gel permeation chromatography (GPC) analysis of the product polycarbonate. Standards of polystyrene were used to construct a universal calibration against which polycarbonate could be measured using the Mark-Houwink equation. The temperature of the columns was 25° C. and the mobile phase was chloroform.

Fries content (ppm) was determined by KOH mediated hydrolysis of the product polycarbonate. The amount of Fries product for each of the melt polycarbonates listed in Table 1 was determined as follows. First, 0.50 grams of polycarbonate was dissolved in 4.0 ml of THF (containing p-terphenyl as internal standard). Next, 3.0 ml of 18% KOH in methanol was added to this solution. The resulting mixture was stirred for two hours at this temperature. Next, 1.0 ml of acetic acid was added, and the mixture was stirred for 5 minutes. Potassium acetate was allowed to crystallize over 1 hour. The solid was filtered off and the resulting filtrate was analyzed by liquid chromoatograph using p-terphenyl as the internal standard.

Data are gathered in Table 1 which demonstrate the superiority of the catalysts used according to the method of the present invention relative to conventional catalysts. Conventional catalyst performance was illustrated using sodium hydroxide in Comparative Examples 1 and 2 (CE-1, CE-2). In Comparative Examples 1 and 2 and in Examples 1–7 the catalyst was used in an amount corresponding to from about $5 \times 10^{-6}$ to about $0.5 \times 10^{-6}$ moles of primary catalyst per mole bisphenol A. In all cases a co-catalyst, TMAH, was also present in an amount corresponding to about $2.5 \times 10^{-4}$ mole TMAH per mole bisphenol A. The product polycarbonate was in all instances bisphenol A polycarbonate. In Table 1 the column heading "Primary Catalyst" indicates the specific transesterification catalyst of the invention employed, or, in the case of Comparative Examples 1 and 2, the known transesterification catalyst sodium hydroxide, NaOH. "$M_n$" denotes number average molecular weight in daltons. The column heading "Fries" indicates the amount of Fries rearrangement product present in the product polycarbonate. "Fries" values are given in parts per million (ppm).

TABLE 1

| Example | Primary Catalyst | Formula | $M_n$ | Fries |
|---|---|---|---|---|
| Primary Catalyst Concentration was $5 \times 10^{-6}$ moles per mole BPA | | | | |
| CE-1 | Sodium Hydroxide | NaOH | 8800 | 3200 |
| Example 1 | Sodium Antimonate | $NaSbO_3$ | 7427 | 252 |
| Example 2 | Sodium meta germanate | $Na_2GeO_3$ | 8880 | 779 |
| Example 3 | "Tartar emetic" | IV | 9530 | 1201 |
| Primary Catalyst Concentration was $1 \times 10^{-6}$ moles per mole BPA | | | | |
| CE-2 | Sodium Hydroxide | NaOH | 8200 | 415 |
| Example 4 | Sodium meta germanate | $Na_2GeO_3$ | 9136 | 404 |
| Example 5 | "Tartar emetic" | IV | 9800 | 650 |
| Primary Catalyst Concentration was $0.5 \times 10^{-6}$ moles per mole BPA | | | | |
| Example 6 | Sodium meta germanate | $Na_2GeO_3$ | 7524 | 136 |
| Example 7 | "Tartar emetic" | IV | 8812 | 440 |

The results in Table 1 clearly illustrate the effectiveness of the catalysts of the present invention as melt polymerization catalysts as compared to sodium hydroxide (CE-1, CE-2). At a catalyst loading of 5x10–6 moles primary catalyst per mole BPA employed, the achievement of relatively high molecular weight ($M_n$ at least about 8800 daltons) results in the generation of a substantial amount (about 3200 ppm) of undesired Fries rearrangement product when sodium hydroxide is employed. In contrast, catalysts of the present invention (Examples 2 and 3) provide product polycarbonate having $M_n$ greater than 8800 daltons with substantially reduced levels of Fries rearrangement product. Sodium antimonate (Example 1) appears to be somewhat less effective than the other catalysts of the present invention. Notwithstanding its somewhat lower catalytic activity of sodium antimonate, a significant molecular weight build was observed in Example 1 and the level of Fries product was low.

A second series of melt polymerizations was run employing $1 \times 10^{-6}$ moles primary catalyst per mole of BPA, (See Comparative Example 2 and Examples 4 and 5). The catalysts of the present invention provided much higher molecular weight materials than did sodium hydroxide (CE-2).

Levels of Fries rearrangement product were slightly higher in Examples 4 and 5 than in Comparative Example 2. Because Fries content is frequently a function of molecular weight, the Fries levels observed in Examples 4 and 5 are considered low relative to those observed in Comparative Example 2.

Example 7 illustrates the effectiveness of "tartar emetic", structure IV, as a transesterification catalyst according to the method of the present invention at a concentration of $0.5 \times 10^{-6}$ moles per mole BPA.

This invention has been described in detail with particular reference to preferred embodiments thereof, but it will be understood that variations and modifications can be effected within the spirit and scope of the invention.

What is claimed is:

1. A method for the preparation of polycarbonate said method comprising contacting at least one diaryl carbonate with at least one dihydroxy aromatic compound in the presence of a transesterification catalyst and optionally a co-catalyst, under melt polymerization conditions to afford a polycarbonate, said transesterification catalyst comprising at least one alkali metal or alkaline earth metal salt of antimony or germanium said salt having structure I

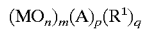

wherein M is antimony or germanium, n is an integer in a range from 0 to 4, m is an integer in a range from 1 to 2, A is independently at each occurrence an alkali metal ion or an alkaline earth metal ion, p is an integer in a range from 1 to 4, $R^1$ is an organic ligand having structure III

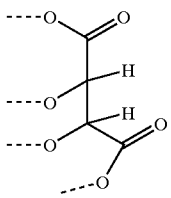

and q is an integer in range from 1 to 2.

2. A method according to claim 1, wherein M is Sb, n is 0, m is 2, A is an alkali metal ion or an alkaline earth metal ion, p is 1 or 2, and q is 2.

3. A method according to claim 2 wherein said alkali metal ion or an alkaline earth metal ion is selected from the group consisting of Na, Li, K, and Mg ions.

4. A method according to claim 3 wherein said alkali metal ion or an alkaline earth metal ion is selected from the group consisting of sodium ion and potassium ion.

5. A method according to claim 4 wherein said catalyst has structure IV

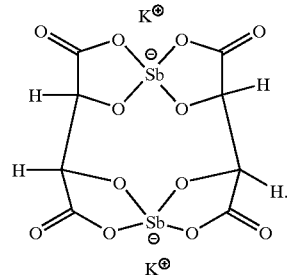

6. A method according to claim 1, wherein M is Ge and Sb, n is 0, m is 2, A is an alkali metal ion or an alkaline earth metal ion, p is ½ or 1, and q is 2.

7. A method according to claim 6 wherein said alkali metal ion or an alkaline earth metal ion is selected from the group consisting of Na, Li, K, and Mg ions.

8. A method according to claim 7 wherein said alkali metal ion or an alkaline earth metal ion is selected from the group consisting of sodium ion and potassium ion.

9. A method according to claim 1 wherein said dihydroxy aromatic compound is a bisphenol having structure V

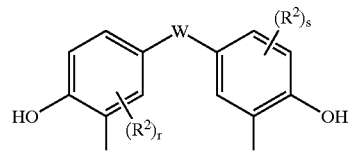

wherein $R^2$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; r and s are independently integers 0–3; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

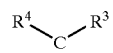

wherein $R^3$ and $R^4$ are independently a hydrogen atom, $C_1$–$C_{20}$ alkyl group, $C_4$–$C_{20}$ cycloalkyl group, or $C_4$–$C_{20}$ aryl group; or $R^3$ and $R^4$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

10. A method according to claim 9 wherein said bisphenol is selected from the group consisting of bisphenol A; 2,2-bis(4-hydroxy-3-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; and 1,1-bis(4-hydroxyphenyl)-3,3,5-trimethylcyclohexane.

11. A method according to claim 1 wherein said diaryl carbonate has structure VI

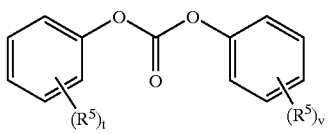

wherein $R^5$ is independently at each occurrence a halogen atom, nitro group, cyano group, $C_1-C_{20}$ alkyl group, $C_1-C_{20}$ alkoxy carbonyl group, $C_4-C_{20}$ cycloalkyl group, or $C_6-C_{20}$ aryl group; and t and v are independently integers 0–5.

12. A method according to claim 11 wherein said diaryl carbonate is selected from the group consisting of diphenyl carbonate, bis(4-methylphenyl)carbonate, bis(4-chlorophenyl)carbonate, bis(4-fluorophenyl)carbonate, bis(2-chlorophenyl)carbonate, bis(2,4-difluorophenyl)carbonate, bis(4-nitrophenyl)carbonate, bis(2-nitrophenyl)carbonate, and bis(methyl salicyl)carbonate.

13. A method according to claim 1 wherein said contacting at least one diaryl carbonate with at least one dihydroxy aromatic compound in the presence of a transesterification catalyst under melt polymerization conditions is carried out in the presence of one or more branching agents.

14. A method according to claim 13 wherein said branching agent is 1,1,1-tris(4-hydroxyphenyl)ethane.

15. A method according to claim 1 wherein said contacting at least one diaryl carbonate with at least one dihydroxy aromatic compound in the presence of a transesterification catalyst under melt polymerization conditions is carried out in the presence of at least one endcapping agent.

16. A method according to claim 15 wherein said endcapping agent is a hydroxy aromatic compound.

17. A method according to claim 16 wherein said hydroxy aromatic compound is selected from the group consisting of phenol, p-tert-butylphenol, p-cumylphenol, and cardanol.

18. A method according to claim 1 wherein said transesterification catalyst is employed in an amount corresponding to between $1 \times 10^{-8}$ and $2.5 \times 10^{-4}$ moles catalyst per mole dihydroxy aromatic compound.

19. A method according to claim 1 wherein said co-catalyst is selected from the group consisting of quaternary ammonium compounds, quaternary phosphonium compounds, and mixtures thereof.

20. A method according to claim 19 wherein said quaternary ammonium compounds are selected from the group consisting of tetramethyl ammonium hydroxide and tetrabutyl ammonium hydroxide, and said quaternary phosphonium compounds are selected from the group consisting of tetrabutyl phosphonium acetate and tetrabutylphosphonium hydroxide.

21. A method for the preparation of bisphenol A polycarbonate said method comprising contacting at least one diaryl carbonate with bisphenol A in the presence of a transesterification catalyst and optionally a co-catalyst, at a temperature in a range between about 180° C. and about 310° C. and a pressure in a range between about 760 and about 1 torr to afford a product polycarbonate, said transesterification catalyst comprising at least one alkali metal or alkaline earth metal salt of antimony or germanium, said salt having structure I

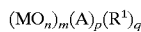

wherein M is antimony or germanium, n is an integer in a range from 0 to 4, m is an integer in a range from 1 to 2, A is independently at each occurrence an alkali metal ion or an alkaline earth metal ion, p is an integer in a range from 1 to 4, $R^1$ is an organic ligand having structure III

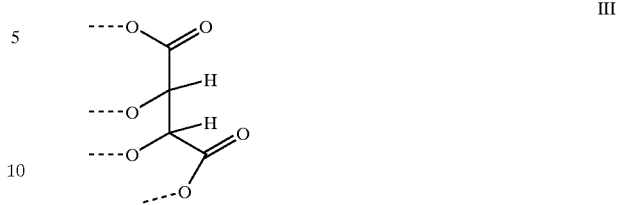

and q is an integer in a range from 1 to 2.

22. A method according to claim 21, wherein M is Sb, n is 0, m is 2, A is an alkali metal ion or an alkaline earth metal ion, p is 1 or 2, and q is 2.

23. A method according to claim 22, wherein said alkali metal ion or an alkaline earth metal ion is selected from the group consisting of Na, Li, K, and Mg ions.

24. A method according to claim 23 wherein said alkali metal ion or an alkaline earth metal ion is selected from the group consisting of sodium ion and potassium ion.

25. A method according to claim 21 wherein said catalyst has structure IV

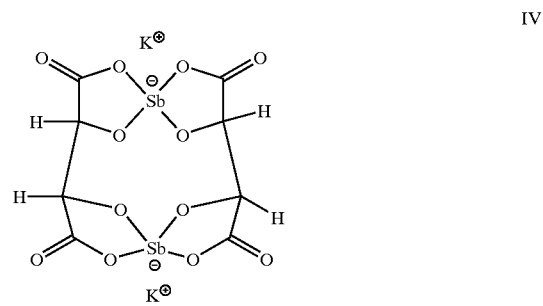

26. A method according to claim 21 wherein said diaryl carbonate has structure VI

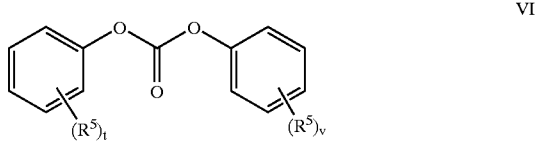

wherein $R^5$ is independently at each occurrence a halogen atom, nitro group, cyano group, $C_1-C_{20}$ alkyl group, $C_1-C_{20}$ alkoxy carbonyl group, $C_4-C_{20}$ cycloalkyl group, or $C_6-C_{20}$ aryl group; and t and v are independently integers 0–5.

27. A method according to claim 26 wherein said diaryl carbonate is selected from the group consisting of diphenyl carbonate, bis(4-methylphenyl)carbonate, bis(4-chlorophenyl)carbonate, bis(4-fluorophenyl)carbonate, bis(2-chlorophenyl)carbonate, bis(2,4-difluorophenyl)carbonate, bis(4-nitrophenyl)carbonate, bis(2-nitrophenyl)carbonate, and bis(methyl salicyl)carbonate.

28. A method according to claim 21 wherein said contacting at least one diaryl carbonate with bisphenol A in the presence of a transesterification catalyst and optionally a co-catalyst, is carried out in the presence of one or more branching agents.

29. A method according to claim 28 wherein said branching agent is 1,1,1-tris(4-hydroxyphenyl)ethane.

30. A method according to claim 21 wherein said transesterification catalyst is employed in an amount corresponding to between $1\times10^{-8}$ and $2.5\times10^{-4}$ moles catalyst per mole dihydroxy aromatic compound.

31. A method according to claim 21 wherein said co-catalyst is selected from the group consisting of quaternary ammonium compounds, quaternary phosphonium compounds, and mixtures thereof.

32. A method according to claim 31 wherein said quaternary ammonium compounds are selected from the group consisting of tetramethyl ammonium hydroxide and tetrabutyl ammonium hydroxide, and said quaternary phosphonium compounds are selected from the group consisting of tetrabutyl phosphonium acetate and tetrabutylphosphonium hydroxide.

33. A method for the preparation of bisphenol A polycarbonate, said method comprising contacting bisphenol A with diphenyl carbonate at a temperature in a range between about 180° C. and about 310° C. and a pressure in a range between about 760 torr and about 1 torr in the presence of a catalyst having structure IV,

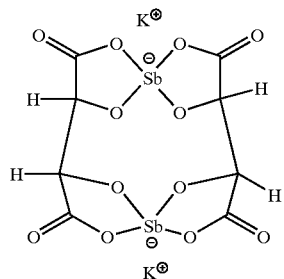

IV and tetrabutylphosphonium acetate, said diphenyl carbonate being present in an amount corresponding to between about 0.9 and about 1.2 moles diphenyl carbonate per mole of bisphenol A, said catalyst having structure IV being present in an amount corresponding to between about $1\times10^{-8}$ and about $2.5\times10^{-4}$ moles catalyst IV per mole bisphenol A employed, said tetrabutyl phosphonium acetate being present in an amount corresponding to between about $1\times10^{-6}$ and about $1\times10^{-2}$ moles tetrabutyl phosphonium acetate per mole bisphenol A employed.

* * * * *